D. B. Jordan,
Lubricator.
No. 250. A. I. Patented Aug. 30, 1859.
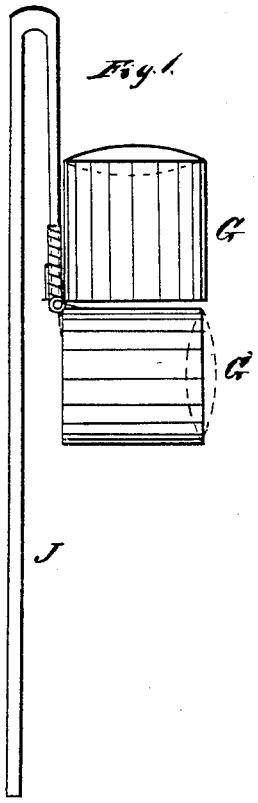
AM. PHOTO-LITHO. CO. N.Y. (OSBORNE'S PROCESS)